United States Patent Office 3,507,699
Patented Apr. 21, 1970

3,507,699
PROCESS FOR MAKING A NICKEL ELECTRODE
Melvyn B. Pell, New York, and Raymond W. Blossom, Brooklyn, N.Y., assignors to Yardney International Corp., New York, N.Y., a corporation of New York
No Drawing. Filed Feb. 2, 1968, Ser. No. 702,506
Int. Cl. H01m 35/30
U.S. Cl. 136—76                                5 Claims

ABSTRACT OF THE DISCLOSURE

A process is described for impregnating porous nickel plaques with bivalent $Ni(OH)_2$ by cathodic impregnation in a concentrated acidic nickel nitrate electrolyte containing an acid-stable high molecular weight wetting agent at elevated temperature. The impregnation takes place at high current density and at a constant potential of the porous plaque relative to a reference electrode. Unusually quick impregnations of 6 and 7 a.h./in.³ are obtained.

BACKGROUND

In the patent to Kandler No. 3,214,355, a process is described wherein porous electrodes are made by first inserting a porous conductive frame in an acid electrolyte solution containing nickel nitrate and nitric acid and subsequently cathodically impregnating the frame with nickel hydroxide. The electrolyte is maintained at a pH of about 3 in a solution of 10% concentration of nickel nitrate. In the first example of Kandler, the impregnation process for a .65 mm. (.026 inch) thick porous nickel frame takes about 5 hours, and yields after anodic conversion of the nickel hydroxide to a higher valency a capacity of 1.5 a.h./dm.² (.097 a.h./in.²).

In the patent to Mueller No. 3,203,879, a process is described wherein a porous nickel frame is cathodically impregnated with nickel hydroxide by immersing the nickel frame in a molten (100° C.) nickel nitrate hydrate electrolyte. The electrolyte is maintained acidic by adding nitric acid and the bath is maintained at a pH of about .1.

It has been discovered as described hereafter that a superior electrode can be made by combining several factors. In addition, the time for impregnating the electrode can be reduced by a factor of 30 from that known and a greatly more economic production process for making metal electrodes has been obtained.

SUMMARY OF THE INVENTION

It is therefore an object of this invention to provide a method for making nickel hydroxide electrodes by cathodic impregnation of a porous conductive plaque immersed in an electrolyte of aqueous acidic concentrated solution of nickel nitrate held at an elevated temperature and maintained at a pH of less than 3.

It is a further object of this invention to produce a superior electrode with the process hereinafter described.

It is a still further object of this invention to provide a method for impregnating a porous conductive plaque by cathodically impregnating the plaque in an electrolyte of aqueous acidic concentrated solution of nickel nitrate held at an elevated temperature and maintained at a pH between 0 and 3 and wherein the cathodic impregnation is obtained maintaining the current supply at a constant potential relative to a reference electrode and its magnitude is so chosen that the initial current density based upon the apparent surface area of the porous plaque is high to yield a short impregnation period.

It is still further an object of this invention to remove any residual nickel nitrate from the impregnated plaque by soaking the plaque in a solution of potassium hydroxide.

DESCRIPTION

As is known in the art, a porous plaque of nickel or nickel alloy is inserted in a solution of nickel nitrate and nitric acid together with an electrode preferably of nickel. The porous nickel frame may be first dipped into a nickel nitrate solution to assure complete penetration of nickel nitrate throughout the pores of the frame prior to submersion into the acidic nickel nitrate solution. Subsequently, the plaque is connected cathodically to a power supply and the other electrode anodically to the supply. As the nitrate inside the pores of the plaque is reduced to ammonia, the pH rises sufficiently within the plaque to precipitate $Ni(OH)_2$. A concentration gradient is set up and $Ni^{++}$ and $(NO_3)^-$ ions continually diffuse into the frame to replenish the material consumed. The first deposit of active nickel hydroxide material is inside the plaque and gradually the bores of the entire plate are filled. The final result is a fully impregnated plaque.

The initial soaking of the plaque of nickel or nickel alloy may be done under reduced pressure, say at 5 mm. of mercury, in an aqueous solution of nickel nitrate having a specific gravity of 1.58 at room temperature. The soaking is performed for about 5 minutes to thoroughly provide nickel nitrate throughout the entire porous plaque.

Several problems were encountered when the cathodic impregnation was attempted at substantially room temperature. For instance, it was observed that for current densities of 80 milliamperes per square inch or less, the pH concentration gradient inside the porous frame was apparently insufficient to load the frame with the nickel hydroxide. On the other hand, at high current densities of greater than 300 milliamperes per square inch, the pH gradient was so sharp as to cause precipitation of nickel hydroxide near the surface of the frame before the inside pores had been fully loaded. For room temperature conditions, the optimum current density for cathodization, appeared to be somewhere between 100 to 150 milliamperes per square inch. Furthermore, with this type of rate, a maximum loading of 4.5 to approximately 5 ampere hour per cubic inch was obtained with an impregnation time taking 6 to 7 hours. These figures are applicable for a 30 mil thick nickel porous plaque.

The temperature of the solution will rise slightly as a result of the impregnation; the rise may be about 5° C. No substantial increase in temperature was observed. Experiments have subsequently shown that increasing the impregnation temperature to substantially higher than the room temperature coupled with the use of a concentrated solution of nickel nitrate and by maintaining the plaque at a constant potential relative to a reference electrode would yield a more uniform plate, with a greater nickel hydroxide content in a shorter operating time.

Thus, a solution was prepared in which aqueous nickel nitrate having a specific gravity of approximately 1.58 at 22° C. was mixed with cobalt nitrate and Carbowax. The composition of this solution was specifically as follows:

1100 g. $Ni(NO_3)_2 \cdot 6H_2O/1$ solution
55 g. $Co(NO_3)_2 \cdot 6H_2O/1$ of solution
1 g. Union Carbide Carbowax 6000/1 of solution.

Although 1.58 specific gravity is the preferred concentration of $Ni(NO_3)_2$ other values may be used such as between about 700 to about 1150 grams of $Ni(NO_3)_2$ per liter of solution.

The cobalt nitrate is a standard additive to improve capacity maintenance. The Carbowax is an acid-stable high molecular weight wetting agent added to improve the wettability of the plaque.

Several porous nickel plaques of different thicknesses were impregnated in an electrolyte of the composition described in a tank containing approximately 10 liters. During impregnation, the electrolyte was agitated by a motor driven plastic propeller to achieve uniform pH, temperature and composition throughout the bulk of the solution. A nickel electrode was inserted as the anode; a reference electrode, for instance a silver/silver chloride/electrode was used to monitor the potential of the cathode.

In a first instance a 20 mil. thick porous nickel frame of the dimensions 2.65 inches x 1.84 inches was inserted in this solution and on each side thereof an anode consisting of $\frac{1}{32}$ inch thick nickel sheet and measuring 4 x 3 inches was positioned approximately 2½ inches from each of the faces of the nickel porous frame.

The positive of a D.C. power supply was connected to the anode electrodes and the negative to the porous nickel frame and cathodic impregnation was commenced. Initially the current density was adjusted to provide between 0.5 and 2.5 amperes per square inch, preferably 2.0 amperes per square inch. This critical current density is chosen by adjusting the potential relative to the reference electrode. The density of the current is computed on the basis of the apparent, i.e., geometric, surface area of the plaque. Thereafter, the porous frame is held at a constant potential relative to the silver/silver chloride reference electrode of between 2 and about 6 volts depending on the desired initial current charging rate. The voltage is maintained constant until a loading of the plaque has been obtained which is equivalent to between 6 and 7 ampere hours per cubic inch. This loading is based upon a theoretical calculation wherein the increase of weight of the nickel frame of 3.46 grams of nickel hydroxide is equivalent to one ampere hour. With the bath maintained at 80° C., loading in excess of 6 ampere hours per cubic inch were obtained in less than 10 minutes where the initial cathodic current was 2 amperes per square inch or more.

With different temperatures of the bath, the following conditions and capacities were obtained for the impregnated 20 mil thick nickel frame.

| Temperature, °C. | Cathodic Potential vs. Ag/Cl Ref. v. | Initial Current, A/in.² | Final Current, A/in.² | Theoretical Capacity, AH/in.² |
|---|---|---|---|---|
| 70 | 3.5 | 2.0 | .58 | 7.3 |
| 80 | 3.5 | 2.0 | .76 | 7.5 |
| 90 | 3.1 | 2.0 | .82 | 7.7 |

From these data for different temperatures, it can be seen that for the 20 mil thick porous nickel frame, little variation in capacity results from variation of temperature. In each of the above impregnated plaques, the time to reach the capacity of 6 ampere hours per cubic inch was less than 10 minutes.

For thicker nickel porous plaques greater temperature dependence is observed and additional time is needed to obtain full impregnation with the desired capacity between 6 and 7 ampere hours per cubic inch. Thus, a 30 mil plaque having the dimensions similar to the 20 mil thick plaque described before was impregnated in about 15 minutes to a capacity of approximately 6.75 ampere hours per cubic inch at 80° C. whereas at 70° C. it was impregnated to 6 ampere hours per cubic inch in the same time. Other 30-mil thick nickel plaques were impregnated in 20 minutes time to capacities of 6.4 ampere hours per cubic inch. A similar 40-mil thick plaque was impregnated to 6.2 ampere hours per cubic inch in 40 minutes. These impregnations all commenced with an initial current of 2 amperes per square inch and were carried out at constant potential relative to the reference Ag/AgCl electrode.

Subsequent to the impregnation of the nickel plaques, the plaques are cathodically polarized in a 25% solution of KOH which is kept at 90° C. The purpose of this is to assure complete elimination of any remaining nitrate. Customarily this polarization is done at ½ ampere per square inch and for approximately 20 minutes.

Another process for eliminating any residue of nickel nitrate is by soaking the impregnated plaque in a solution of KOH. The solution has a concentration of from 5 to 45%, with best results at 25% KOH by weight. Although this conversion can be done at room temperature, about 22° C., elevated temperatures are preferred to reduce the soaking time. A soaking at 90° C. for 30 minutes has been found to satisfactorily completely convert the nickel nitrate to nickel hydroxide.

Subsequently, the plaque is anodically connected in a pure alkaline solution to transform the bivalent nickel hydroxide into a higher nickel hydroxide. The testing of such completed nickel positive electrodes showed excellent performance in a nickel cadmium cell. With a test regime wherein the nickel cadmium cell was subjected to a one hour charge to 120% of theoretical capacity with a subsequent discharge at the 2 C. rate, excellent performance for more than 400 cycles was obtained. Capacity did not decrease and in fact showed an increasing performance especially for those nickel plaques impregnated at the higher initial currents.

In view of the foregoing description, it is evident that the higher temperature operation of the impregnation process provides a significant improvement both with respect to the final product obtained, as well as to the time required to perform this. A temperature range was found with an optimum at 80° C. with the 30 mil thick electrode. However, satisfactory impregnation was obtained at 70° C. and increased performance was obtained at 90° C. The results indicate that impregnation of the plaque in an electrolyte kept at elevated temperature of at least 60° C. but less than 90° C. provides improved performance in the process as well as the product. Plaques from 10 mil to 200 mil thicknesses may be so impregnated.

Although the pH may be maintained within the range from 0–3, it is preferably held at 1.5. In such case, acidity can be controlled by adding preselected quantities of nitric acid when the impregnation current is interrupted.

What is claimed is:

1. A process for preparing nickel plates for accumulators which comprises the steps of:
   (a) Immersing a porous electrically conductive plaque in an electrolyte bath provided with a counter-electrode, the bath comprising an aqueous nickel nitrate solution of specific gravity 1.58 (at 22° C.) and including an acid-stable high molecular weight wetting agent, the bath being maintained at elevated temperatures in the range 60–100° C.;
   (b) Forming the conductive plaque cathodically against the anodic counterelectrode at a constant voltage selected to provied an initial current density, based upon the apparent surface area of the plaque, in excess of 1.5 ampere hours per square inch until the pores are substantially filled wtih nickel hydroxide and wherein the forming is continued until the amount of nickel hydroxide in the pores of the plaque is equivalent to a loading of at least 6 ampere hours per cubic inch.

2. The process according to claim 1 where the electrolyte bath is adjusted during the forming to maintain the pH in the range 1–3.

3. The process according to claim 1 wherein the bath further includes a cobalt salt.

4. The process according to claim 1 including the further step:
   (c) Soaking the plaque after forming in a heated aqueous alkali solution to remove residual salts from the forming bath.

5. The process according to claim 4 which includes the further step:
   (d) anodically connecting, in an alkaline bath against a counterelectrode, the formed plaque and electrolyzing the nickel hydroxide therein to a higher nickel hydroxide.

References Cited

UNITED STATES PATENTS

| | | | |
|---|---|---|---|
| 3,031,517 | 4/1962 | Peters | 136—76 |
| 3,203,879 | 8/1965 | Mueller | 136—29 |
| 3,214,355 | 10/1965 | Kandler. | |
| 3,305,398 | 2/1967 | Herold et al. | 136—29 |
| 3,335,033 | 8/1967 | Kober | 136—76 |

FOREIGN PATENTS 758,667  5/1967  Canada.

WINSTON A. DOUGLAS, Primary Examiner

C. F. LeFEVOUR, Assistant Examiner

U.S. Cl. X.R.

136—29; 204—56